United States Patent [19]

Schreck

[11] Patent Number: 4,583,315
[45] Date of Patent: Apr. 22, 1986

[54] SUPPLY AND DISPENSER DEVICE FOR FISHING LINES AND LIKE THREADS

[76] Inventor: Hans W. Schreck, Urbachstrasse 32, D-3559 Bottendorf, Fed. Rep. of Germany

[21] Appl. No.: 538,960

[22] Filed: Oct. 4, 1983

[51] Int. Cl.⁴ ............................................. A01K 97/00
[52] U.S. Cl. ................................ 43/54.1; 242/118.41; 242/137.1; 43/57.2
[58] Field of Search .................... 43/54.1, 43.11, 57.2, 43/57.1, 44.98; 242/146, 118.41, 137, 137.1, 138

[56] References Cited

U.S. PATENT DOCUMENTS

| 718,114 | 1/1903 | Finney . | |
|---|---|---|---|
| 1,908,278 | 5/1933 | Angell | 43/54.1 |
| 1,926,836 | 9/1933 | Corlett | 242/137.1 |
| 2,553,097 | 5/1951 | Lampe | 43/54.1 |
| 2,785,869 | 3/1957 | Howard, Sr. et al. | 43/54.1 |
| 2,895,691 | 7/1959 | Toler . | |
| 3,008,664 | 11/1961 | McCormick | 43/54.1 |
| 3,011,735 | 12/1961 | Lachat . | |
| 3,039,226 | 6/1962 | Bagdonas | 43/57.2 |
| 3,096,951 | 7/1963 | Jenson | 242/137.1 |
| 3,962,815 | 6/1976 | Christensen | 43/54.1 |
| 3,991,507 | 11/1976 | Bart | 43/54.1 |
| 4,009,845 | 3/1977 | Santucci et al. | 242/137.1 |
| 4,026,063 | 5/1977 | Allen et al. | 43/54.1 |

FOREIGN PATENT DOCUMENTS 2454268 12/1980 France ................................. 43/54.1

OTHER PUBLICATIONS

Bill DeWitt Pyra-Shell Baits and Boxes, p. 7, Nos. 40 and 41 Line Carriers.

Primary Examiner—Nicholas P. Godici
Assistant Examiner—Kurt Rowan
Attorney, Agent, or Firm—Fred Philpitt

[57] ABSTRACT

The invention proposes a supply and dispenser device (10) for fishing lines and like threads. Within a casing (12) and/or its cover (18), a plurality of reels (20, 20', etc.) are nested most closely. Between the reels (20, 20' etc.) which touch each other with circumferential friction, the various lines are held in any position and are guarded against inadvertently falling back or out. For cutting off a desired length of the line stored, a cutter (40) is arranged in or on the central hub (26) which is extended towards the cover inside for the purpose. A fender (42) is provided for preventing injuries; it may form an inner stop for cover (42) that is hinged to the base plate (14) of the casing (12).

12 Claims, 4 Drawing Figures

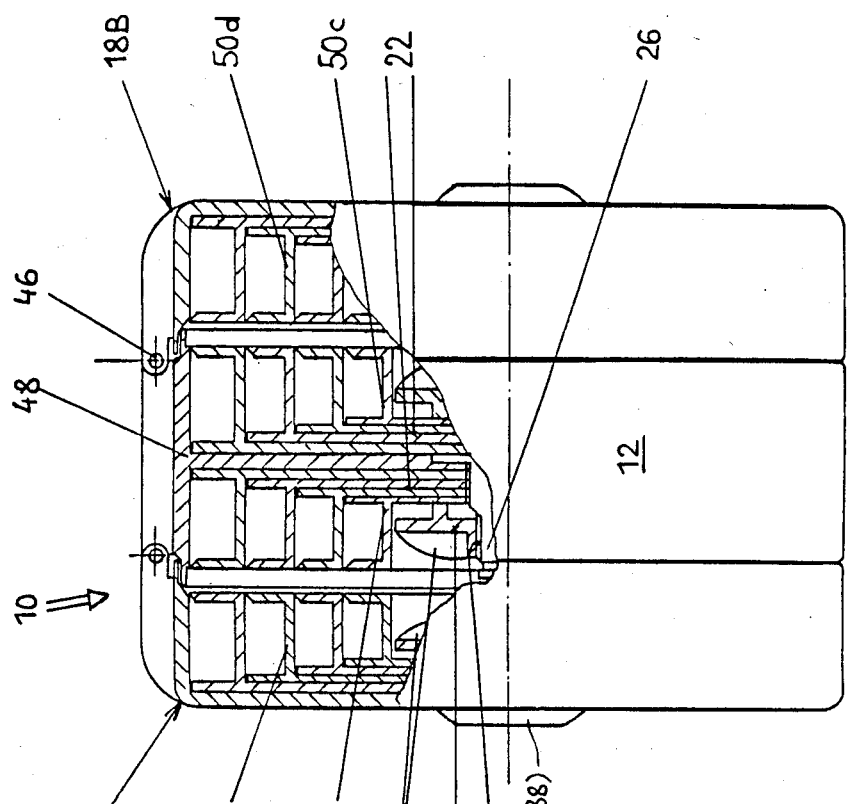
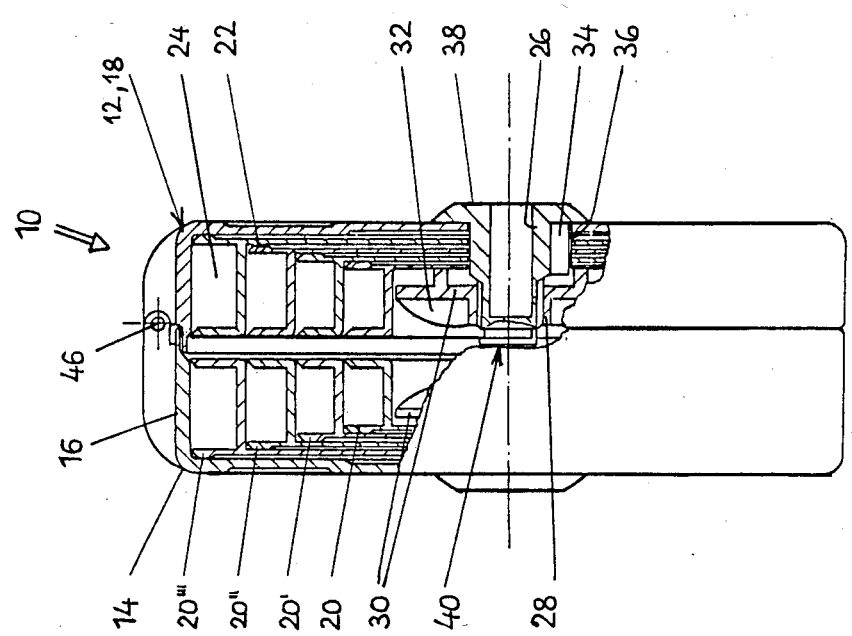
Fig. 4
Fig. 3

SUPPLY AND DISPENSER DEVICE FOR FISHING LINES AND LIKE THREADS

The invention relates to a supply and dispenser device for fishing lines and like threads, having a casing with a cover for receiving a plurality of reels on at least one side of a walled base plate.

BACKGROUND OF THE INVENTION

For fishing with the use of flies or other lures, a length of line is commonly knotted between the end of the fishing line and the hook to suit the needs of the moment. Short of this, it would be necessary to continuously adapt the size, weight and length of the entire main line to the particular requirements; this would require a large stock of coil supplies. The length of fishing line knotted in between is called leader. It is about 3 to 10 feet long and is prone to heavy wear. But in case of a ground hook-up, the leader is expected to tear so that the expensive main line is saved, if possible with all its length and over an extended period of time. A frequent change of the leader size may become necessary, depending on the sensitivity of the fish.

It will be seen that the leader must be changed at frequent occasions. In the past, it was customary to carry along one loose reel for each line size; often loops came off inadvertently, providing considerable disorder in the fishing equipment containers. Moreover, there is anyhow little space available for storing the fishing accessories, expecially for fly-type fishing.

PRIOR ART

In conventional leader dispensers having hinged sections or sections placed back to back, several reels are held on fixed pins in each such section. Frequently the reels run too easy or they are too tight; loops coming off curl or entangle. Clamping pieces or springs projecting outwardly are supposed to retain the respective thread end. However, in practical use the line believed to be clamped may easily be loosened and pulled out, e.g. if it gets hooked up somewhere, be it at a button, a branch or whatever. Conversely, the remaining end may slip in and disappear. The projecting clamping means and the spring-borne cutters, respectively, may cause injuries.

A supply and dispenser device as disclosed in DE-OS 27 06 970 includes a casing with cover and compartments that receive a plurality of reels at least on one side of a base plate. Each confining side wall comprises a slotted clamping piece of rubber or soft plastics; the desired length of thread is meant to be pulled out through the slot. The end left over after cutting ought to be held by the clamping faces, but this is not at all uniformly effected due to variations of size and smoothness of the line, different moisture, etc. Much space is required by the compartments being arranged side to side so that the dispenser is not very handy and is rather heavy. Furthermore, the cover(s) may get lost.

There are similar drawbacks with spools for fishline leaders as shown in U.S. Pat. No. 2,514,697. Such spools are relatively bulky, being of elliptical shape to house a coaxial array of compartments, while the interior is hollow and empty.

OBJECTS OF THE INVENTION

It is an object of the invention to overcome the prior art and to improve a supply and dispenser device of the type mentioned initially such that lines, threads, leaders, etc. can be orderly accommodated within a small volume.

Another object of the invention consists in providing a supply and dispenser device for storing and releasing lines, threads, leaders, etc. of various sizes or diameters in such way that the length required can readily got hold of without damaging it and be cut off while the remaining end is held sticking out for future usw.

Further objects of the invention are to create a supply and dispenser device that is small and handy; that operates reliably; that is decay-proof as well as resistant to heat and frost; that can be cleaned easily; and that warrants comfortable use free of injury.

SUMMARY OF THE INVENTION

The invention provides a supply and dispenser device of the type mentioned initially, wherein the reels have different sizes, each of the reels comprising a circular base and a coil compartment that extends laterally from the periphery of the base, and wherein the reels are nested in contacting relation at least along a peripheral line, the outermost reel having line contact to the inner periphery of the casing or of its cover.

FEATURES OF THE INVENTION

The supply and dispenser device according to the invention accommodates within most narrow space a plurality of reels for storing at least one line or thread, but preferably several lines of various sizes. The reels are nested in the casing and/or in the cover and are non-rotatory relative thereto. The lines, threads or the like can be pulled out between the peripheries of the reels but are held frictionally by the reel skirts contacting each other so that the respective line ends are prevented from slipping in and from falling out inadvertently. The desired length of line can be cut by means of a cutter expediently arranged on the hub. In particular, the supply and dispenser device includes hinges for joining the casing to the cover(s) so that modular extensions are possible.

For practical use, into the largest reel filled with the desired line is inserted the casing which e.g. has a wall height of 15 to 20 mm. An end of about 2 cm length is kept sticking out between the contacting skirts of the casing and this reel. Thereupon the next smaller reel with its supply line coil is inserted into the hollow of the largest reel. The procedure is repeated with the next reels until all the reels are nested and only the line ends stick out from between the respective contacting skirts.

Owing to the central bearing consisting of hub and counterpart screwed together, an axial thrust is provided between the casing and the reels. Using markings, preferably between the innermost reel and the central hub, the thrust can be reproducibly adjusted. Thus each line end is clamped with equal force between the adjacent contacting edges. The adjustment of the clamping force is assisted by the resiliency of the reel bases which are shaped as disks and are supported by line contact at the underside so that the center of the assembly is compressible.

When a line is required, the respective end is gripped and pulled out from the reel in an axial direction. The desired length is cut off at the cutter. The remaining line end is safely held for future use. Clamping can be effected by tangent or overlapping touch of two adjacent components.

If the reels would turn relative to the casing and or the cover, the lines would entangle. In order to prevent this, the invention provides a retaining contrivance, e.g. a radial lug at the central hub and a cooperating matching recess at the casing and at the reels.

In the assembled device, the central hub projects relative to the counterpart to which it is threadingly engaged. A cutter support may be interchangeably mounted to the projecting portion. For obtaining the desired line length, it is laid around the cutting edge or blade and cut off by a sharp pull. A fender is provided for protecting the user from injuries; it may be shaped as a mushroom-type head or bead.

Due to the diameters of the reels increasing outwardly, the bending radius for the respective line stored increases likewise. Therefore, the line or thread issues in a very straight manner, in contrast to the customary curling with small reels. Conventional devices do not attain such straight pull-out, especially with lines or threads of larger diameter.

If the reels are made of transparent plastics, the coil capacity available at any particular time can be visually inspected without the need to open or disassemble the dispenser device.

LISTING OF FIGURES OF THE ANNEXED DRAWINGS

FIG. 1 is a side view of a supply and dispenser device according to the invention, partly in axial cross section, FIG. 2 is a top view of the device shown in FIG. 1, with part of a cover broken off, FIG. 3 is a side view similar to FIG. 1 of a modified device, and FIG. 4 is a side view similar to FIG. 3 of yet another embodiment.

DETAILED DESCRIPTION

Figure 2:
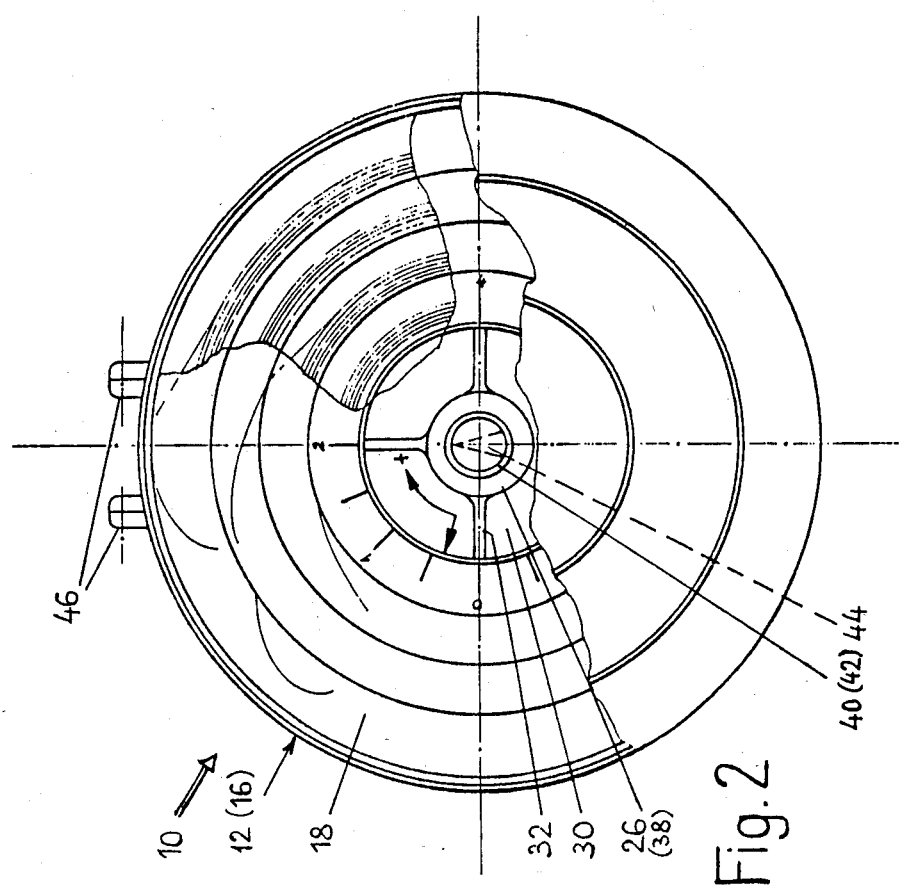
Figure 1:
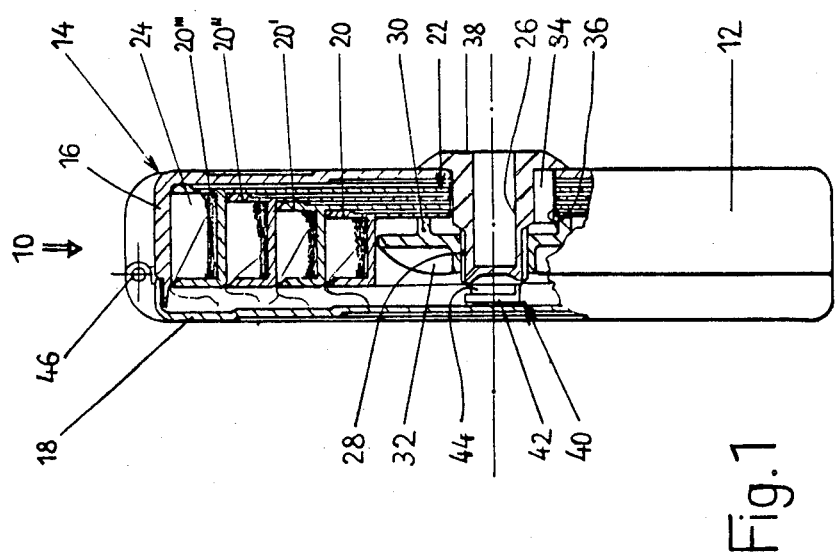

The embodiment shown in FIGS. 1 and 2 includes a supply and dispenser device 10 having a casing 12 with a circular base plate 14 whose side wall 16 encircles the base plate 14. By means of a dismountable hinge 46, the case 12 is connected to a cover 18 which is also circular and encircled by a side wall matching that of casing 12.

A group of reels 20, 20', 20", 20''' is fitted into the casing 12 such that the outermost reel 20''' which has the largest diameter is in tangent or overlapping contact with the inner periphery of the casing 12. A like reel 20" of smaller diameter is inserted into the outermost reel 20'''. A further, still smaller reel 20' is nested within reel 20' and, in turn, encircles an innermost reel 20. Though it is feasible to increase the number of reels thus nested, care should be taken to keep the device 10 handy. It would be less easy to use if its outer diameter were to substantially exceed the dimensions shown with about natural size in FIGS. 1 and 2.

Each of the reels 20, 20', 20", 20''' has a circular base plate 14 and a coil compartment 24 extending laterally from the periphery of the base plate. The outer diameters are dimensioned so as to warrant at least line contact between the peripheral edges or skirts of adjacent reel compartments. Such line contact may be tangential or overlapping.

All the reels 20, 20', etc. are borne by a central hub or bush 26 having a threaded section 28 of smaller diameter. A counterpart 30 including handles 32 is in screwing engagement with the hub 26. The reels 20, 20', etc. are locked against rotation relative to the casing 12, e.g. by means of a lug 34 parallel to the axis of the threaded section 28 and of a matching recess 36.

The reels 20, 20', etc. are pressed onto each other and onto the casing 12 by the central hub 26 and its counterpart 30. The line ends (schematically indicated) are clamped between the reel peripheries.

Central hub 26 has a cap 38 fitting the outside bottom of casing 12 and extends up to a plane or a near-plane with which the coil compartment edges or skirts are aligned. Furthermore, central hub 26 bears a cutter support 40 comprising a fender 42 and underneath the latter a knife or blade 44 for cutting the required line length. Fender 42 may also be designed to form an inner stop for cover 18.

It will be seen that the supply and dispenser device 10 contains, in the embodiment of FIGS. 1 and 2, a single space for accommodating the reels and other components. By contrast, the embodiment shown in FIG. 3 features two such spaces in a double array or two-cup dispenser 10 having reels 20, 20', etc. on either side and having a cover 18 the design of which corresponds to that of casing 12.

Another embodiment of the dispenser 10 including more than one space for accommodating the reels and other components is evident from FIG. 4. A central portion 48 comprises two hinges 46 for connection to covers 18A, 18B on either side. A reel group 50a is attached to cover 18A, another reel group 50d is attached to cover 18B, and two further reel groups 50b, 50c are supported by central portion 48. A central hub or bush 26 without cap can be employed as fixing means extending through central portion 48.

It should be noted that such a multiple array can, in turn, be extended by further reel compartment components. An overly deep axial dimension may, however, detract from handiness.

Substantial advantages of the supply and dispenser device according to the invention reside in that it is most compact,
in that no parts project from its main body,
in that the line or thread ends are safely held in their stationary positions, clamping being warranted even under wet conditions,
in that the line can be pulled out from the device against a well-defined frictional force that can be adjusted if necessary or desired,
in that any length of line can be cut off and
in that various bending radii or coil diameters can be allotted to different line or thread sizes so that the material pulled out will not tend to curl.

Moreover, the dispenser 10 if closed is adapted to swim for a given period of time. It can therefore easily be regained should it be dropped into the water. It is not indispensable that the device 10 have smooth outer surfaces since some roughness may facilitate its handling. Preferably the casing and cover(s) are made of plastic material such as polypropylene, ABS (acrylonitrile-butadiene-styrene), polyamide, etc. The reels are expediently of transparent plastics such as polycarbonate. Materials of the polyacetal resin or polyoxymethylene types are suitable for central bush 26.

Numerous modification are possible within the frame of the invention. Thus hinge 46 need not be a pin articulation but can also be a foil or sheet hinge. Casing 12 may have faces, sunk areas, recesses, etc. for applying labels, markings or similar symbols. Marks may be provided for aiding in the adjustment of clamping pressure, by arbitrary units. Instead of the locking means mentioned, stud bolts may be provided either on the bottom plate of the casing or on the reel base so as to extend through holes that are there or that are generated during assembly. The cutter support may bear an interchangeable blade or knife. Any blade or knife may be ground on one side only, but if one edge is covered by protecting means, double-edge cutters can also be used.

While preferred embodiments have been illustrated and explained hereinabove, it should be understood that further variations will be apparent to one skilled in the art without departing from the principles of the invention which, therefore, is not to be construed as being limited to the specific forms described.

I claim:

1. A supply and dispenser device for fishing line leaders comprising in combination:
   (a) a casing with a cover and a walled base plate,
   (b) a plurality of different diameter reels, each of which includes a circular base and a coil compartment with flanges that extend laterally from the periphery of the base for receiving a leader supply,
   (c) bearing means including a central hub for nesting the reels in contacting relation at least along a peripheral line on one side of the walled base plate, the outermost reel having line contact to the inner periphery of the casing,
   (d) axially adjustable tensioning means so as to hold the nested reels in a non-rotatory relation to the casing for axially dispensing the leaders,
   (e) the reels being of successively different height, each such that the innermost reel is lowest and that the outer coil compartment flanges of the nested reels are substantially flush.

2. A device according to claim 1 wherein the casing includes a centrally arranged cutter support that carries a blade and a fender, the cutter support being arranged within the central hub.

3. A device according to claim 2 wherein the fender is a cap axially extending from the central hub so as to form a stop to the inside of the cover.

4. A device according to claim 1 wherein the cover contains a further group of nested reels on a central hub at the opposite side of the base plate.

5. A device according to claim 1 wherein the casing comprises a central portion with reel groups being attached to central hubs at either side of the base plate and wherein two covers are hinged to said central portion, each of the covers containing a further reel group likewise mounted on a central hub.

6. A device according to claim 1 wherein the cover contains a further group of nested reels on a central hub at the opposite side of the base plate.

7. A device according to claim 2 wherein the casing comprises a central portion with reel groups being attached to central hubs at either side of the base plate and wherein two covers are hinged to said central portion, each of the covers containing a further reel group likewise mounted on a central hub.

8. A device according to claim 3 wherein the casing comprises a central portion with reel groups being attached to central hubs at either side of the base plate and wherein two covers are hinged to said central portion, each of the covers containing a further reel group likewise mounted on a central hub.

9. A device according to claim 1 wherein the casing comprises a central portion with reel groups being attached to central hubs at either side of the base plate and wherein two covers are hinged to said central portion, each of the covers containing a further reel group likewise mounted on a central hub.

10. A device according to claim 2 wherein the casing comprises a central portion with reel groups being attached to central hubs at either side of the base plate and wherein two covers are hinged to said central portion, each of the covers containing a further reel group likewise mounted on a central hub.

11. A device according to claim 3 wherein the casing comprises a central portion with reel groups being attached to central hubs at either side of the base plate and wherein two covers are hinged to said central portion, each of the covers containing a further reel group likewise mounted on a central hub.

12. A device according to claim 4 wherein the casing comprises a central portion with reel groups being attached to central hubs at either side of the base plate and wherein two covers are hinged to said central portion, each of the covers containing a further reel group likewise mounted on a central hub.

* * * * *